Fig. 8 ized June 6, 1967

3,323,547
VALVE

Norman W. Van Husen, Jr., 23250 Churches St., Southfield, Mich. 48075, and Thomas J. O'Brien, 14111 St. Marys, Detroit, Mich. 48227
Filed Oct. 12, 1964, Ser. No. 403,005
16 Claims. (Cl. 137—625.64)

This invention relates to fluid valve devices and, more particularly, to fluid valve devices capable of being electrically or mechanically actuated.

Fluid valve devices generally comprise one or more valves or fluid flow controlling members movably mounted in a valve housing, actuator means for actuating the flow controlling member, releasing means for restoring the flow controlling member and fluid conduit means communicating with the flow controlling member. Fluid valve devices such as mechanically and electrically actuated valve devices are well known in the art. It is also well known to operate these valve devices by single and double solenoids. One example of valve devices operated with either single or double solenoid is disclosed in Collins Patent No. 3,035,611. It is often necessary in valve installation to convert from one type of operation to another. For example, it might be required to convert from a single solenoid operated valve device to a double solenoid operated valve device. Or, it might be necessary to convert a direct acting solenoid to a pilot operated solenoid. It is often necessary to gang valve devices together so that the valves might operate from individual supplies and individual exhausts, or from individual supplies and a common exhaust, or from a common supply and an individual exhaust, or from a common supply and a common exhaust. In accordance with existing practice, when these conversion requirements occur, the entire valve device is replaced if a single valve device needs to be converted from one type of operation to another. And, in banks of valve devices, either an individual valve device is replaced or the entire bank of valve devices is replaced in order to achieve the required conversion. This is expensive, time consuming and requires valve device dealers to stock a large number of different types of valve devices and combinations of valves and valve actuators.

Accordingly, it is an object of this invention to provide an improved type valve device construction which can be readily converted from one type to another or may be repaired by replacing a defective component.

It is another object of this invention to provide an improved valve device construction which can be modified by simply replacing that portion of the valve device which is to be modified.

It is another object of this invention to provide an improved valve device construction in which the valve actuator may be modified by replacing that portion of the valve actuator which needs to be modified or may be repaired by replacing an inoperative actuator.

It is a further object of this invention to provide a valve device construction which can be readily ganged and which can be modified from one type of operation to another without replacing the entire valve device structure.

It is a still further object of this invention to provide a valve device construction which can be ganged without manifolds and in which the fluid flow sequences can be quickly and easily modified.

Briefly, in accordance with aspects of this invention, we employ, in a valve device construction, a base having a number of conduits formed therein defining fluid passages, a valve body mounted on said base, a valve or flow controlling member in the body for controlling the fluid flow and an intermediate fluid passage housing between the valve body and the base, which fluid passage housing is readily removable and has a plurality of channels communicating with the base and with the valve body. The combination further includes a removably mounted valve actuator, or actuators, which can be selectively mounted on the valve body depending upon the required operations. Further, these valves may be ganged without manifold by simply securing the bases side-by-side, using pre-tapped and relieved assembly holes and sealing adjacent ports and conduits with a novel combination of O-ring seal and annular plugs. Advantageously, fluid flow sequences are obtained by plugging any unwanted ports, preferably with flush plugs. There are at least four basic fluid flow sequences, any one of which may be selectively produced in the assembled gangs of valve devices of this type. For example, the ganged valve devices may employ individual supplies and individual exhausts of pressurized fluid. This arrangement is preferable when a controlled line pressure to each valve is required as well as individual speed control for each valve and/or when exhaust is to be piped for another function. Alternatively, it is possible with ganged valve devices to employ an individual supply and a common exhaust when controlled line pressure for each valve is required but one outlet for the exhaust from all the valves is sufficient.

In accordance with another alternate arrangement, it is possible to gang the valve devices to employ a common supply and individual exhaust when it is necessary to control the speed of individual flow control members or cylinders. This arrangement is usually undesirable when more than one valve is to be operated at the same time. As a fourth alternative, these novel valve devices may be ganged to employ a common supply and a common exhaust preferably when all valves can be fed from one supply line and one exhaust line. This arrangement is also undesirable if more than one valve is to be operated at the same time.

Advantageously, this valve device construction employs interchangeable component parts which may be assembled to make valve devices of almost limitless variety. One of the advantages of this arrangement is that extensive inventories of specialized valve devices are eliminated because the valve devices can be readily changed or adapted from one type of installation to another by substituting or switching only those parts which need to be modified. For example, a valve device can be changed from a direct acting solenoid to a pilot operated solenoid by simply changing solenoid capsules which change is accomplished by loosening two captive screws. Also, a smaller valve size can be provided by the use of reducer bushings.

These and various other objects and features of the invention will be more clearly understood from a reading of the detailed description of the invention in conjunction with the drawing in which.

Figure 1:
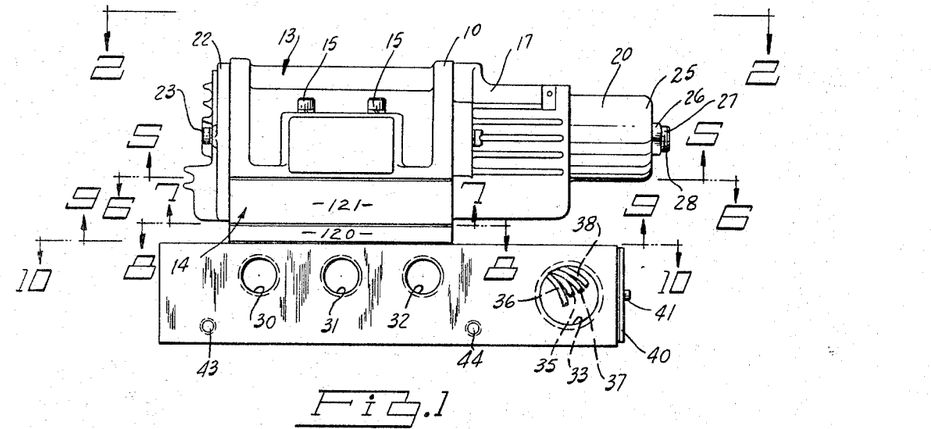
FIGURE 1 is a view in elevation of a single solenoid air pilot operated embodiment of this invention.
Figure 2:
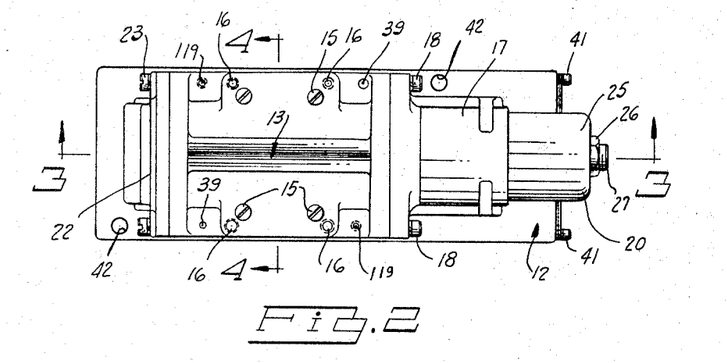
FIGURE 2 is a plan view of the embodiment of FIGURE 1.

Referring now to the drawing in which like numbers designate like parts, FIGURE 1 is a view in elevation and FIGURE 2 is a plan view of FIGURE 1, which figures show one illustrative single solenoid, air pilot operated embodiment of this invention in which a valve body 10 is mounted on a base 12 by means of an intermediate fluid passage housing 14. The valve body includes a valve cap 13 secured to housing 14 and base 12 by means of four screws 15. The cap 13 is provided with a group of four threaded holes 16 by which the components of the device may be secured together when the device is mounted upside down with respect to the position shown in FIGURES 1 and 2. In this particular embodiment, the valve is controlled by a pilot valve, not shown, mounted in a pilot valve body 17 which is secured to the valve cap 13 by means of screws such as screws 18. Secured to the pilot valve body 17 by any convenient means such as by threaded engagement, which will be subsequently shown and described, is a pilot valve operator in the form of a solenoid 20. The opposite end of the valve cap 13 from the pilot valve body 17 is enclosed by means of a spring cover 22 which is secured to the valve cap 13 by means of screws 23. The solenoid 20 includes a cover 25 which is secured in place by means of a nut 26 which threadably engages a core 27 of the solenoid and specifically a threaded cylindrical surface 28.

The base 12 is provided with a group of fluid ports for permitting the intake and exhaust of fluid under pressure depending upon the particular flow circuits desired. This group includes a port 30, a port 31 and a port 32. Merely for the purpose of explanation of operation, it is assumed that port 30 is a cylinder controlling port for controlling fluid pressure to a first cylinder exteriorly of the valve device, not shown, port 31 is connected to a pressurized fluid supply and port 32 is connected to a first exhaust conduit, also not shown. The base 12 also includes a suitable port 33 through which a group of wires 35, 36, 37 and 38 may pass. In this particular embodiment, because only a single solenoid 20 is employed, only two of the wires such as wires 35 and 36 which may be connected to the coil of solenoid 20 need be brought through the wire port 33. To facilitate assembly of the cap 13 and the intermediate fluid passage housing 14, a pair of dowel or guide pin holes 39 is provided in cap 13, which holes are aligned with holes in housing 14, which will be subsequently described. The base 12 includes a suitable cover 40 which is held in place by screws, such as screw 41, so that the cover may be removed to permit access to the wires 35 through 38. In order to mount the base 12 on a bracket or shelf, not shown, a pair of holes 42 is provided in diagonally opposite sections, as shown in FIGURE 2. The base 12 also includes a pair of screw holes 43, 44 through which suitable ganging screws may be inserted for the purpose of ganging or connecting together a plurality of valve bases 12. Housing 14 is formed of the two members 120, 121 each having a pair of screw holes 45 for the reception of holding screws 56 so that housing 14 may be assembled to cap 13 as a unit.

Figure 3:
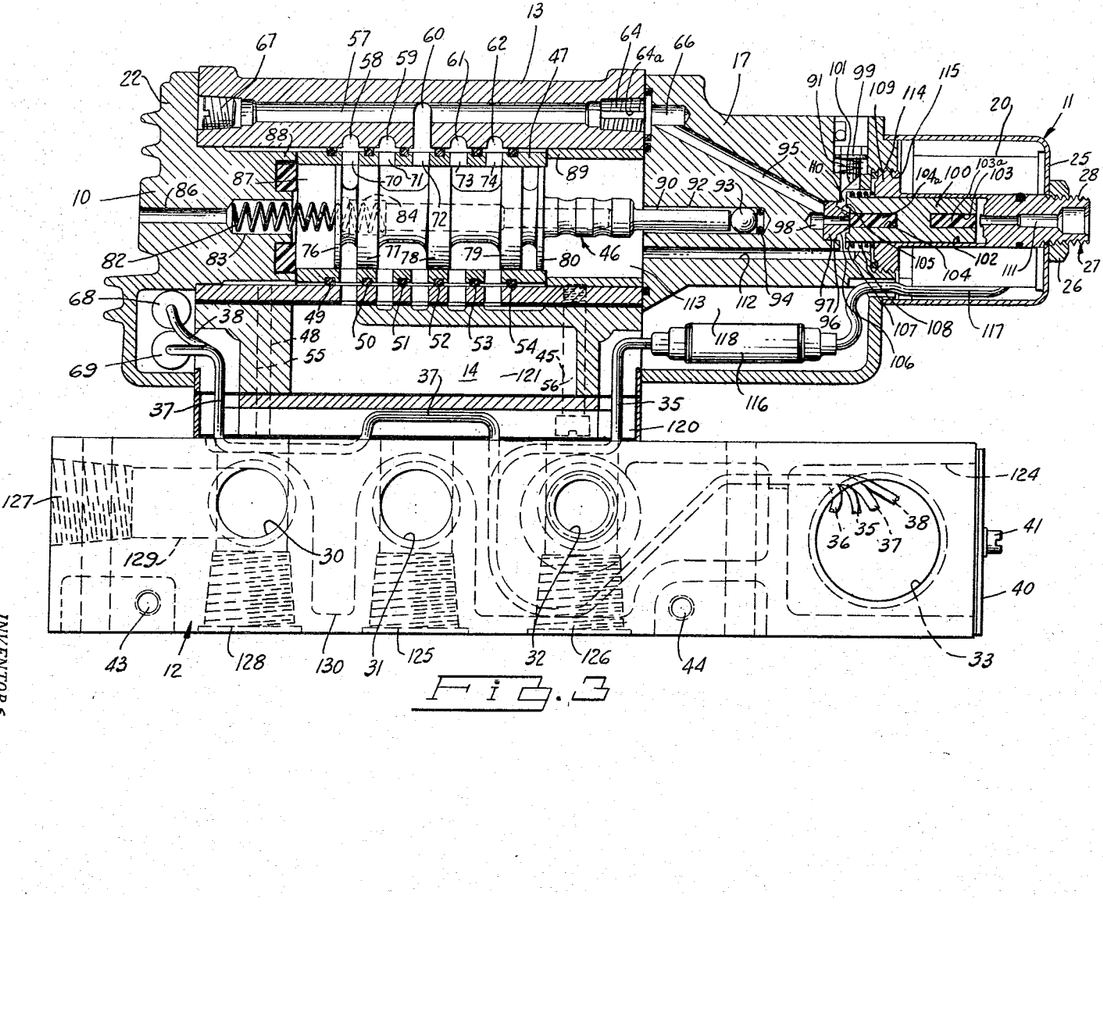
FIGURE 3 is a view in elevation and in section taken along the line 3—3 of FIGURE 2, to an enlarged scale, and looking in the direction of the arrows.

FIGURE 3 is a view in elevation and in section, to an enlarged scale, taken along the line 3—3 of FIGURE 2 and looking in the direction of the arrows. As shown in this figure, the valve cap 13 has a valve spool 46 slidably mounted in a valve spool sleeve 47. Both the spool 46 and sleeve 47 may be formed from hardened material such as stainless steel and lapped to a high precision fit. Also, the cylindrical surfaces of spool 46 and the apertures in sleeve 47 are provided with sharp edges to shear foreign matter and insure trouble-free operation. The spool sleeve 47 is provided with a group of annular peripheral notches each of which receives an O-ring from a group of O-rings 49, 50, 51, 52, 53 and 54 which O-rings define fluid seals between the spool sleeve 47 and the valve cap 13. Because the sleeve "floats" in the static O-ring seals 49–54, thermal and mechanical distortion is prevented. Further, because no working seals are provided between sleeve 47 and spool 46, a long, trouble-free life is assured. Still further, because of the pressure balanced installation of the spool 46, in this instance both ends being vented to the ambient, the spool 46 is not translated in sleeve 47 by fluid supply pressure variations. An alignment pin 55 is shown in one of the alignment pin holes 48 and a screw 56 is shown coupling the elements of the fluid passage housing 14 to the cap 13. The valve cap 13 engages the peripheries of the O-rings 49–54 and includes a longitudinal fluid passage 57 and a plurality of annular fluid chambers 58, 59, 60, 61 and 62. Advantageously, annular passage 60 communicates with the longitudinal passage 57 for the purpose of providing a flid flow path for fluid which is controlled by the pilot valve in a manner which will be subsequently described. The longitudinally extended passage 57 is threaded at each end thereof for the reecption of a stop plug. One end of the passage 57 is enclosed by the stop plug 64 having an axial passage 64a therethrough to restrict the flow from passage 57 to passage 66 in the pilot valve body 17. The opposite end of the passage 57 from the plug 64 is closed by a suitably threaded stop plug 67. Advantageously, the provision for threaded terminations of the passage 57 permits the insertion and removal of annular bore-restricting plugs, and the insertion and removal of the passage closing stop plug 67 such that the cap 13 may be converted for different types of valves. For example, if it is desired to employ a pilot valve and solenoid combination on the left-hand end of the valve body as viewed in FIGURE 3, the spring cover 22 is removed by removing the screws 23 and the plug 67 is removed. A plug corresponding to plug 64 is substituted for the plug 67 and a valve body and solenoid arrangement similar to that seen on the right-hand side of FIGURE 3 is connected to the left-hand end of the valve cap 13. When this modification is made, the wires of the added solenoid are connected to the wires 37, 38 by means of a pair of quick disconnect type electrical connectors 68, 69.

The cylindrical sleeve 47 is provided with a plurality of radially extending fluid passages 70, 71, 72, 73 and 74. These passages communicate with annular chambers 58, 59, 60, 61 and 62, respectively. The valve spool 46 is slidably mounted within spool sleeve 47 and includes a plurality of spaced cylindrical sections 76, 77, 78, 79 and 80. Certain of these cylindrical sections are axially spaced apart by annular recesses of sufficient length to reach across two sets of fluid passages such as 70, 71, 72, 73 and 74. When the valve spool 46 is translated relative to the spool sleeve 47, these elongated annular recesses define communicating passages between the passages in the spool sleeve 47. Thus, the elongated recesses each permit fluid communication between two annular chambers in the valve cap 13.

The valve spool 46 is normally retained in the position shown in FIGURE 3 by means of a helical spring 82 which is retained in a suitable recess 83 in the spring cover 22 and the spring 82 extends into a cylindrical recess 84 in the valve spool 46. The spring cover 22 is provided with a fluid passage 86 which communicates with the cylindrical chamber 83 to permit the exhaust of fluid from a chamber 87 between the valve spool 46 and the spring cover 22 such that the fluid does not dampen or slow the movement of the valve spool 46. The spool sleeve 47 is retained between an annular inwardly projecting shoulder 88 on the spring cover 22 and an annular spacer bushing 89. The right-hand end of the valve spool 46, as viewed in FIGURE 3, is defined by a reduced axially extending portion 90 which enters a suitable recess 92 in the pilot valve body 17 and, in its extreme right-hand position, the axial extension 90 engages a metal ball 93 behind which is a resilient O-ring 94 which acts as a bumper to arrest the movement of the valve spool 46.

The fluid passage 66 in the pilot valve body 17, which communicates with the longitudinal passage 57 in the cap 13, also communicates with a passage 95 which terminates in a cylindrical chamber 96, which cylindrical chamber 96 has an annular plug 97 therein. The plug 97 has an axial passage (not numbered) formed therethrough. In the process of forming the cylindrical chamber 96, a smaller chamber 98 is formed by drilling a suitable hole in the pilot valve body 17. The chamber 98 communicates with the passage 95. A solenoid activated plunger 100 is slidably mounted in a cylindrical recess 102 in the solenoid core 27. The plunger 100 has a pair of open ended cylindrical chambers 103 and 104 in which are mounted the plugs 103a and 104a, respectively, which are made from a suitable resilient material, as rubber or the like. The plug 104a terminates in a flat end face 105 which is positioned to engage a flat end on the tapered part 106 of the annular plug 97 in fluid sealing relationship to seal the passage through plug 97. The plunger 100 terminates in an outwardly extending flange 107 which retains a spring 108 against an enlarged portion 109 of the solenoid core 27. Spring 108 normally retains the plunger 100 in fluid sealing relationship with the flat end of tapered surface 106 of the annular plug 97. As shown in FIG. 3, the plunger 100 is in the exhaust or de-energized position. When the solenoid 20 is energized, however, the plunger 100 will be moved to the right, as viewed in FIGURE 3, opening the passage through the annular plug 97. Fluid passing through the annular plug 97 now enters a chamber 110 adjacent the left-hand end of the plunger 100, which chamber communicates with a passage 112 which permits the fluid to enter a chamber 113 between the pilot valve body 17 and the cylindrical portion 80 of valve spool 46. It is to be noted that the left-hand end, or enlarged portion, 109 of the solenoid core 27, has a cylindrical threaded surface 114 which threadably engages a surface 115 on the valve body 17. With this arrangement it is possible to remove the nut 26 on the threaded surface 28 of the solenoid core 27 to remove the solenoid cover 25 and the solenoid 20 and to then threadably disengage the solenoid core 27 from the valve body 17. Another actuator or operator may be connected to the valve body 17 to control the operation or the passage of the fluid through the annular plug 97 without changing the basic operation of spool 46. For example, this could be a manually controlled button-type valve or a mechanically operated valve of another type. It is to be noted that the solenoid core 27 is provided with a stepped cylindrical passage 111 which communicates with the ambient air and with the interior of the chamber 102 to permit air to be exhausted through the passage 111 whenever the plunger 100 is moved to the left by the spring 108 to thus prevent air damping of spool 46. The actuator includes a manual button 99 having a tapered surface 101 positioned to engage plunger 100 when button 99 is depressed against a spring 91 to move the plunger 100 to actuate the valve device.

The conductors such as conductor 35 and 36 are connected to the solenoid 20 through suitable quick disconnect type electrical connectors such as connector 116 which connects the wire 35 to a conductor 117 of the solenoid 20. A similar quick disconnect type electrical connector is connected to the conductor 37 and to a conductor, not shown, to connect the return path for the solenoid 20 and these quick disconnect connectors are located in a chamber 118 in the pilot valve body 17. The quick disconnect plugs may be disconnected and neither the plug nor the connectors is mounted on the valve device so that vibration of the valve device does not affect the electrical connections. Further, because the conductors, such as 35, 36, are of longer length than necessary to make the connections, the solenoid 20 may be quickly and easily disengaged from the pilot valve body 17 and tested and replaced, if necessary. This type of testing would not be possible if the parts of the connector were mounted on the mating parts of the device.

The intermediate fluid passage housing 14 includes a first, or lower, housing member 120 which is superimposed on the base 12 as viewed in FIGURE 3 and an upper housing member 121 which is superimposed on the lower housing member 120 and which supports the cap 13. The members 120, 121 provide interconnecting fluid channels which communicate with predetermined passages in the cap 13 and in the base 12 in a manner which will be subsequently described. These housing members are removably retained in position by suitable screws, such as the screw 56 shown in dotted outline in FIGURE 3, so that they may be replaced by other housing members having different fluid passage arrangements to modify the operation of the valve device without replacing unnecessary parts.

Figure 4:
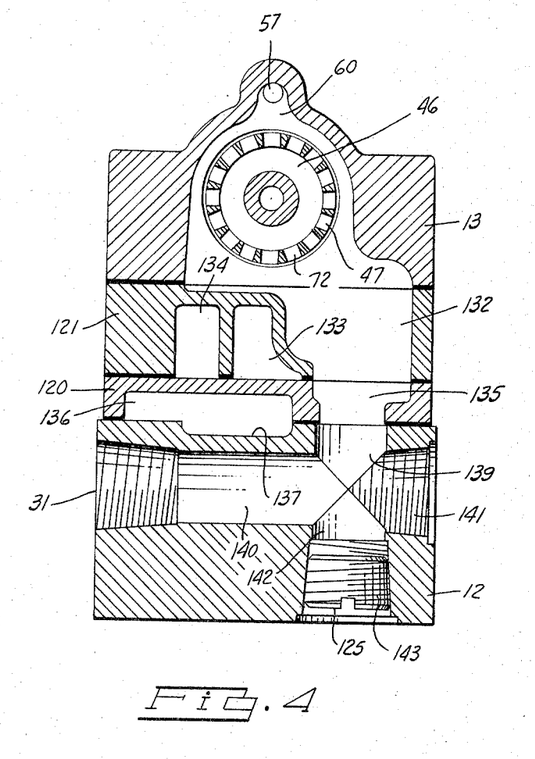
FIGURE 4 is a view in elevation and in section, to the same scale as FIGURE 3, taken along the line 4—4 of FIGURE 2 and looking in the direction of the arrows.

The base 12 is supplied with a built-in conduit box 124 for holding the wires, such as 35, 36, 37 and 38 and this box is enclosed by the cover 40, which cover is retained in position by screws, such as screw 41. The base 12 is also provided with fluid passages which communicate with the ports 31 and 32 to provide a versatile port system. For example, threaded ports 125 and 126 on the bottom of base 12 communicate respectively with the ports or passages 31 and 32. The base 12 further includes a threaded port 127 in the endwall and a port 128 in the bottom which communicate with each other through a suitable passage 129 and with port 30. The port 127 may be connected to a first cylinder to be controlled by the valve device. The base 12 has an irregularly shaped recess 130 in the upper surface thereof which recess communicates with passages in the lower surface of the lower housing member 120, in a manner which will be subsequently described, to receive the wires such as 35, 36, 37 and 38. FIGURE 4 is a view in elevation and in section, taken along the line 4—4 of FIGURE 2 and looking in the direction of the arrows, the scale being the same as that of FIGURE 3. As shown in FIGURE 4, the upper housing member 121 has a passage 132 therein communicating with the annular passage 60 in the cap 13. In this figure, it is noted that the valve sleeve 47 has a plurality of radially extending apertures, such as a group of passages or apertures 72, which communicate with the annular passage 60. The upper housing member 121 also has a longitudinally extending passage 133 and a second longitudinally extending passage 134 which communicate with passages in the lower housing member 120 which will be subsequently described. The lower housing member 120 has a passage 135 therein which communicates with the passage 132 of the upper housing member 121. The lower housing member 120 also has a longitudinal passage 136 in the lower surface thereof which communicates with a longitudinal passage 137 in the upper surface of the base 12. The base 12 includes a passage 139 which communicates with the passage 135 of the lower housing member 120. The inlet, or supply, port 31 communicates with the passage 139 through a suitable transverse passage 140. The passage 140 terminates in a threaded port 141 and a threaded port 125 in the bottom of base 12 communicates with the passage 140 through a relatively short passage 142. In this particular embodiment, the threaded port 125 is closed by a suitably threaded stop plug 143.

Figure 5:
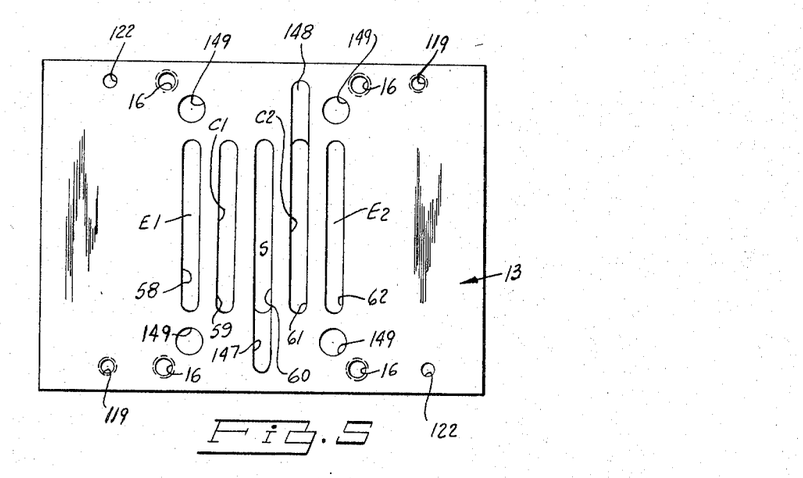
FIGURE 5 is a view in section of the embodiment of FIGURE 1 taken along the line 5—5 thereof, to the same scale as FIGURE 3, and looking in the direction of the arrows.

FIGURES 5 through 10 are sectional views taken along the respective lines of FIGURE 1, and looking in the directions of the respective arrows, each being to the same scale as FIGURE 3. FIGURE 5 shows the elongated entrances to the annular passages 58, 59, 60, 61 and 62. It is to be noted that the elongated aperture communicating with the annular passage 60 has an extended lobe portion 147 which extends downwardly, as viewed in FIGURE 5, and the elongated portion communicating with annular passage 61 has an elongated portion 148 which extends upwardly. FIGURE 5 shows a group of four apertures 149 for receiving screws 15 which pass downwardly through the cap 13. Cap 13 includes a pair of threaded apertures 119 for receiving screws, not shown, for fastening the cap 13 to the members 120, 121. Also, the cap 13 has two apertures 122, which receive the dowels 39.

Figure 6:
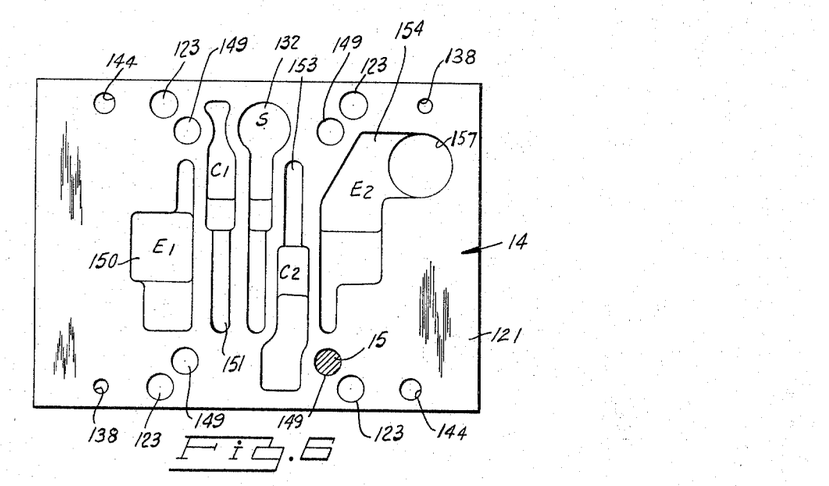
FIGURE 6 is a view in section of the embodiment of FIGURE 1 taken along the line 6—6 thereof, to the same scale as FIGURE 3, and looking in the direction of the arrows.

FIGURE 6 is a top plan view of the upper housing member 121 and shows the apertures 149 for receiving the screws 15, the apertures 138 for receiving dowels 139 and the apertures 144 which cooperate with screw holes 119. The upper housing member 121 includes an irregularly shaped channel 150 which communicates with the annular passage 58 of the cap 13. The member 121 further includes an irregularly shaped channel 151 which communicates with the annular passage 59 of the cap 13. The member 121 includes the irregular channel 132 previously mentioned with respect to FIGURE 4, a fourth irregular channel 153 and a fifth irregular channel 154 which communicate with the passages 60, 61 and 62, respectively, of the cap 13.

Figure 7:
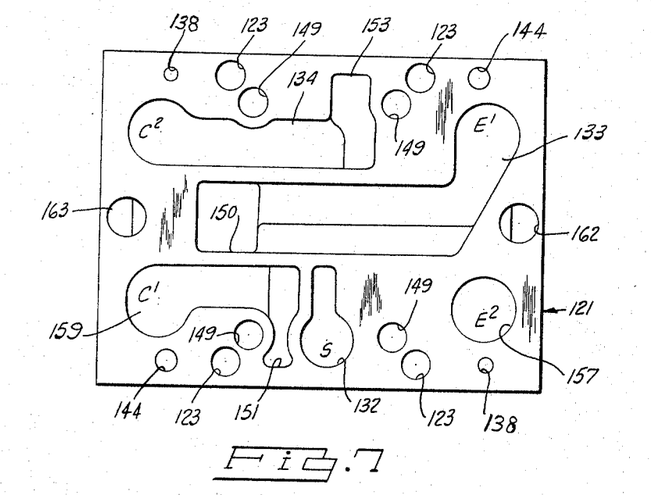
FIGURE 7 is a view in section of the embodiment of FIGURE 1 taken along the line 7—7 thereof, to the same scale as FIGURE 3, and looking in the direction of the arrows.

FIGURE 7 is a bottom view of the upper housing member 121 and shows longitudinal fluid passages communicating with the previously mentioned transverse passages shown in FIGURE 6. For example, the centrally located elongated passage 133, shown also in FIGURE 4, is connected to the passage 150, shown in FIGURE 6, and extends transversely across the center of the bottom of the upper housing member 121 and extends upwardly as viewed in FIGURE 7. The passage 154 of FIGURE 6 terminates in a circular passage 157 in the bottom of member 121, as shown in FIGURE 7. The passage 132 of FIGURE 6 communicates with the passage 132 in the bottom of member 121, as shown in FIGURE 7. The member 121 includes a dished-out passage 159 which communicates with the passage 151 shown in FIGURE 6. The passage 153, as viewed in FIGURE 6, communicates with the longitudinally extending passage 134, shown in FIGURE 7. The member 121 is provided with suitable wire passages 162, 163 through which the wires, such as 35, 36, 37 and 38 may be passed from the solenoids, such as solenoid 20 to reach built-in conduit box 124. The member 121 is also provided with suitable screw holes 123 which may be employed for inverted mounting to secure the upper and lower housing members together, to secure the housing members and cap 13 to the base 12 and to mount the entire assembly on a suitable bracket.

Figure 8:
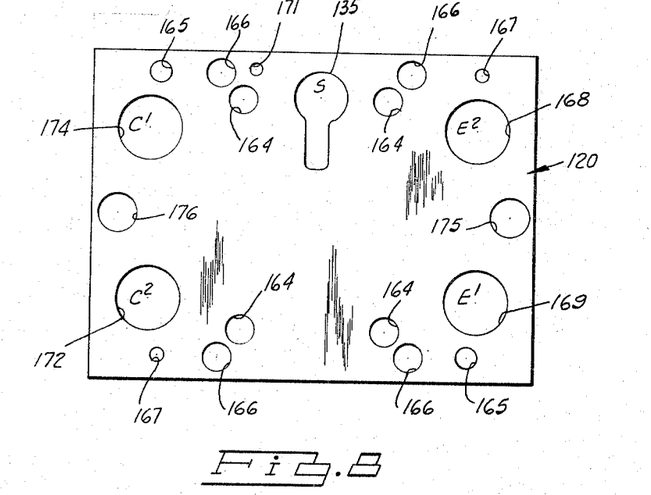
FIGURE 8 is a view in section taken along the line 8—8 of FIGURE 1, to the same scale as FIGURE 3, and looking in the direction of the arrows.

FIGURE 8 is a top view of the lower housing member 120 and shows a group of four screw holes 164 for receiving the screws 15. The housing member 120 also has a group of two dowel pin holes 167 for receiving the pins 39. The member 120 has a further group of four screw holes 166 for cooperating with holes 123 in member 121 for receiving suitable screws, not shown, for inverted mounting of the device, as previously described. The member 120 has a pair of screw holes 165 for receiving the screws 56. The member 120 includes a cylindrical passage 168 which communicates with the passage 157 of the member 121. The member 120 includes a second cylindrical passage 169 which communicates with the passage 133 of the member 121. The member 120 further includes the key-shaped aperture 135 which communicates with the similarly shaped apertures 132 in the member 121. Because of symmetry of the components, the device is provided with a "foolproof" alignment pin passage including hole 171 through member 120. A third cylindrical passage 172 in member 120 communicates with the dished passage 134 of FIGURE 7. A fourth cylindrical passage 174 in member 120 communicates with the irregular passage 159 of FIGURE 7. The member 120 includes a pair of wire passages 175, 176. These wire passages communicate with passages 162, 163, respectively, of FIGURE 7.

Figure 9:
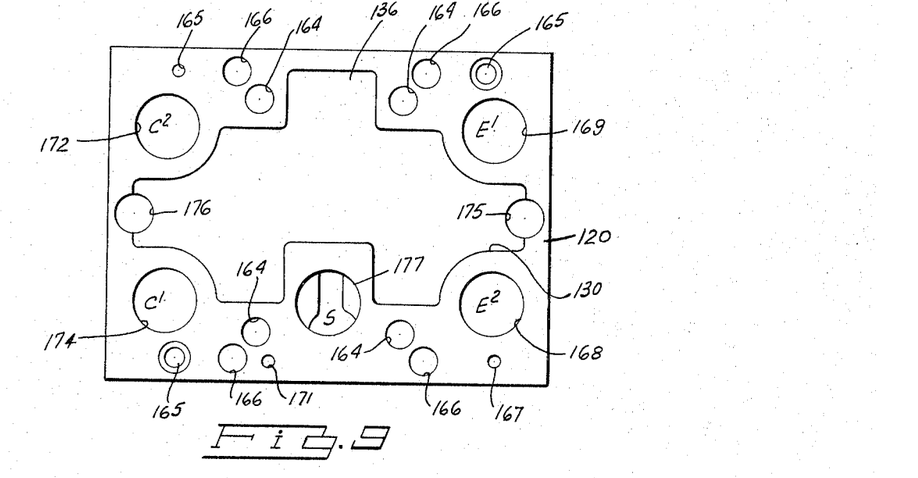
FIGURE 9 is a view in section taken along the line 9—9 of FIGURE 1, to the same scale as FIGURE 3, and looking in the direction of the arrows.

As shown in FIGURE 9, each of the cylindrical apertures 168, 169, 172 and 174 terminates in a correspondingly similar cylindrical aperture designated by the same reference numeral on the bottom of the structure 120. The key-shaped aperture 135 of FIGURE 8, however, terminates in a cylindrical aperture 177 in the bottom of member 120, as shown in FIGURE 9. The bottom of the lower housing member 120 includes the recess 136, previously described with FIGURE 4.

Figure 10:
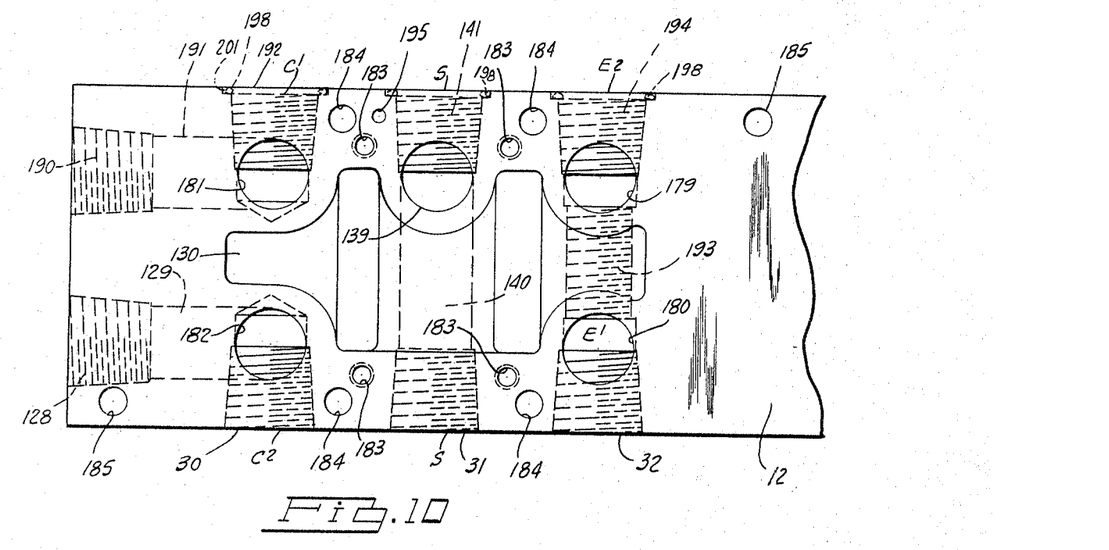
FIGURE 10 is a view in section taken along the line 10—10 of FIGURE 1, to the same scale as FIGURE 3, and looking in the direction of the arrows.

FIGURE 10 is a partial plan view of the base 12 and shows a group of cylindrical apertures 179, 180, 181, 182 and 139 positioned to engage apertures 168, 169, 174, 172 and 177, respectively, of the bottom housing member 120 of FIGURE 9. The base 12 is provided with a plurality of apertures 183 to receive the screws 15. Similarly, the base 12 is provided with a plurality of holes 184 through which screws may be inserted to engage the threaded holes 16 in the cap 13 when the device is mounted upside down with respect to FIGURES 1 and 2. These screws will pass through the holes 123 in the member 121 and through the holes 166 in the member 120. The base 12 is also provided with a pair of screw holes 185 by which the base 12 may be fastened to a suitable mounting bracket or mounting member. The base 12 is provided with a recess 130 which is saddle-shaped and is positioned beneath wiring passages 175, 176 of the lower housing member 120 to receive the wires from the solenoid 20 or from additional solenoids if more than one is employed. As was previously described in conjunction with FIGURE 4, threaded port 31 communicates with a fluid passage 140, passage 139 and with a correspondingly threaded port 141. From FIGURE 10 it is seen that the ports 30 and 32 communicate with fluid passages 129 and 193, respectively. Threaded inlet port 30 communicates through the passage 129 with the threaded port 128 and also communicates with aperture 182. Similarly, a threaded port 190 communicates by means of a passage 191 with a threaded port 192 and with the cylindrical aperture 181. The threaded port 32 communicates with the cylindrical passages 179, 180 through a threaded passage 193. The purpose of the ports 192, 141 and 194 in the side of the base 12 is to permit the valves to be ganged in a manner which will be described in conjunction with FIGURE 11. In the base 12 there is a "fool-proof" alignment pin 195 which engages hole 171 in the member 120.

Advantageously, this novel construction of valves can be ganged without the use of manifolds and may be ganged either in the factory or in the field with a minimum of tools. Further, the valves may be ganged to achieve all sequence combinations of both electrical and fluid flow control. These valves may be ganged together by simply screwing bases side-to-side, using pre-tapped and relieved assembly holes and sealing adjacent ports and conduit boxes with O-ring seals. Air flow sequences or fluid flow sequences are obtained by plugging any unwanted ports with flush plugs. With this approach to the construction and assembly any fluid flow sequence may be achieved with the ganged construction.

Figure 11:
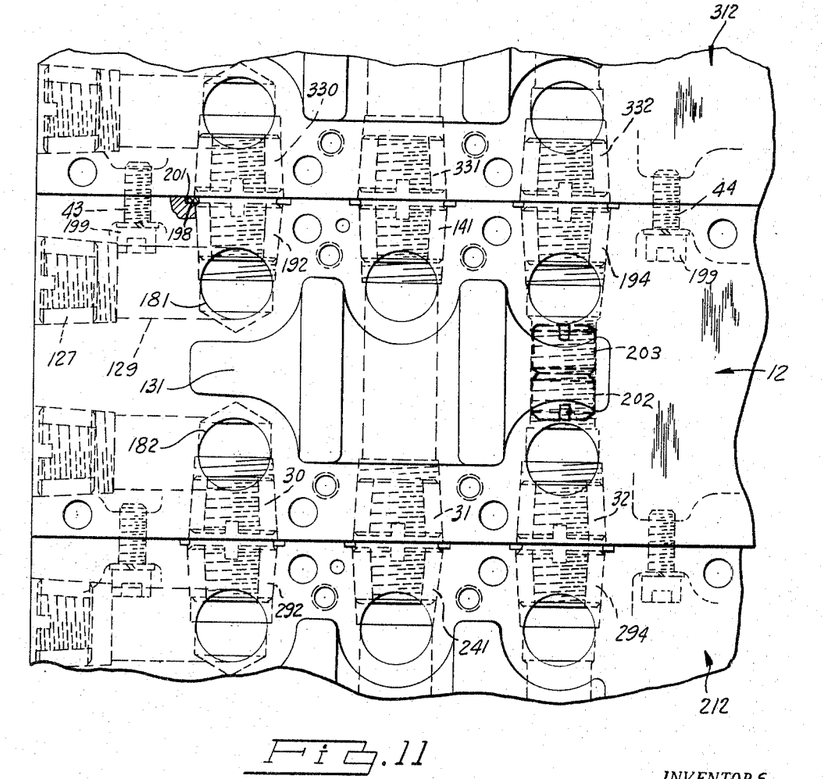
FIGURE 11 is a plan view, partly broken away, of the base of the valve structure of FIGURE 1, to the same scale as FIGURE 3, showing the base joined or ganged to a pair of bases of other valves.

FIGURE 11 is a plan view, partly broken away, of a gang arrangement of the bases of three valve devices, each valve device being identical to that previously described. The base 12, previously described in conjunction with FIGURES 1 through 10, is mounted adjacent a pair of bases designated with identical numbers except prefixed with numbers 200 and 300. When the valve devices are to be ganged together, the diameter of communicating ports may be reduced by inserting a threaded annular plug 196 in each of the opposing ports. The details of this plug will be subsequently described. Advantageously, this gang arrangement is achieved by the insertion of O-ring seals between adjacent bases. For example, the base 12 is joined to a first base 212 and a second base 312 for ganged operation of the respective valves. Before the bases are joined, an annular O-ring 198 is inserted in one of each pair of the enlarged annular apertures 201 encircling the ports or fluid passages which are to be in communication. For example, an O-ring, such as O-ring 198, is inserted in one of the annular recesses 201 between ports 30 and 292, between ports 241 and 31, and between ports 32 and 294 to define fluid seals. Similarly, an O-ring seal 198 is inserted between each pair of opposite threaded ports 192, 330; 141, 331; and 194, 332. After the O-rings are inserted, the bases are connected by means of ganging screws, such as screws 199 which pass through ganging screw holes 43, 44 of base 12. When it is desired to close one of the ports for the ganging operation, a suitable sealing plug such as the plug 143, shown in FIGURE 4, is inserted in the threaded port. After the bases, such as bases 12, 212 and 312 are joined together in fluid sealing relationship, the controls may be ganged in a suitable control system for actuation in accordance with a predetermined sequence.

Figures 12, 14:
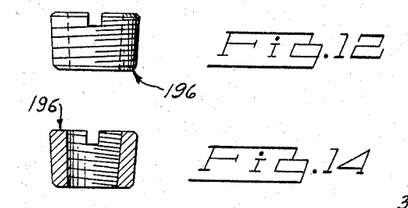
FIGURE 12 is a view in elevation of a plug employed in ganging valves according to this invention, to the same scale as FIGURE 3.
FIGURE 14 is a diametrical section taken along the line 14—14 of FIGURE 13.
Figure 13:
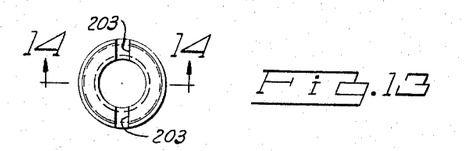
FIGURE 13 is a plan view of the plug of FIGURE 12.

The details of the annular threaded base diameter reducing plug 196 are shown in FIGURES 12, 13, and 14 which are views in elevation, plan and diametrical section, respectively. As shown therein, the plug 196 includes a pair of diametrically opposed notches 203 to permit the insertion of a suitable tool such as a screwdriver for manually threading and unthreading the annular plug 196 relative to the port into which it is inserted. If it is desired to convert the valves to individual exhausts, stop lugs, such as plugs 202 and 203 may be threaded into passage 193.

While we have shown and described one illustrative embodiment of this invention, it is understood that the concepts thereof may be employed in other embodiments without departing from the spirit and scope of this invention. For example, it is possible to employ other types of intermediate fluid passage housing to provide longitudinal and lateral communicating fluid passages. Further, although the invention was described as applied to a single solenoid, pilot air operated device, it may be employed in a double solenoid, pilot air operated device. It may also be employed in a direct operating, single or double, solenoid device or any other of the fluid valve type devices known in the art.

What is claimed is:

1. A plurality of fluid valve devices connected in gang relationship comprising:
   base means for each of said devices having a plurality of fluid passages therein and means coupling said base means together with certain of said fluid passages in communication;
   intermediate fluid passage means removably mounted on each of said base means;
   valve body means including a plurality of fluid passages and each mounted on one of said intermediate fluid passage means, each of said intermediate fluid passage means comprising a plurality of plates, each of said plates having a plurality of ports and fluid passages on each side thereof for selective connection to the ports and passages on the adjacent plate and valve body means and fluid passages in said base means;
   valve means movably mounted in each of said valve body means; and
   actuator means coupled to said valve means for actuating same.

2. A plurality of fluid valve devices coupled together in gang relationship and each including:
   base means having fluid passages therein;
   intermediate fluid passage means removably coupled to said base means;
   valve body means removably coupled to said intermediate fluid passage means each of said intermediate fluid passage means comprising a plurality of plates, each of said plates having a plurality of ports and fluid passages on each side thereof for selective connection to the ports and passages on the adjacent plate and valve body means and fluid passages in said base means;
   valve means including a valve member movably mounted in said valve body means and including a sleeve resiliently mounted in said valve body means, said valve member being movably mounted in said sleeve; and
   actuator means coupled to said valve member for actuating same.

3. The combination according to claim 2 further comprising annular plug means for reducing the diameter of at least one of said fluid passages in said base means.

4. The combination according to claim 1 further comprising stop plug means for closing certain of said fluid passages.

5. The combination according to claim 1 wherein said actuator means includes a pilot valve body coupled to at least one of said valve body means for controlling the operation of the associated valve means.

6. The combination according to claim 2 wherein said actuator means includes at least one solenoid means coupled to one of said valve body means for controlling the operation of the associated valve member.

7. The combination according to claim 2 wherein said actuator means includes:
   a pilot valve body coupled to one of said valve body means;
   a solenoid coupled to said pilot valve body; and
   spring means mounted in said valve body means for moving said valve member.

8. A valve device for connection in gang relationship to control fluid-flow comprising:
   base means having a plurality of fluid passages therein and including means for coupling said base means to another base means with certain of said fluid passages in communication;
   intermediate passage means removably mounted on said base means;
   valve body means including a plurality of fluid passages mounted on said intermediate passage means;
      said intermediate fluid passage means comprising a plurality of plates, each of said plates having a plurality of ports and fluid passages on each side thereof for selective connection to the ports and passages on an adjacent plate and valve body means and fluid passages in said base means;
   valve means movably mounted in said valve body means; and
   actuator means operatively connected to valve means for actuating the same.

9. The valve device as claimed in claim 8 including means for maintaining said valve means in a predetermined position.

10. The valve device as claimed in claim 8 in which said valve means comprises a spool valve.

11. The valve device as claimed in claim 10 in which said valve means comprises an apertured sleeve resiliently mounted on said spool valve.

12. The valve device as claimed in claim 10 in which said sleeve includes a plurality of radial passages and a plurality of axially spaced resilient members circumposed about said sleeve and supporting said sleeve within said valve body means.

13. The valve device as claimed in claim 8 in which said valve body means includes a valve cap having a plurality of chambers therein, said valve means including a sleeve supported in special relationship within said cap means.

14. The valve device as claimed in claim 8 wherein said actuator means comprises a solenoid coupled to said valve means.

15. The valve device as claimed in claim 8 in which said actuator means comprises a pilot valve for controlling operation of said valve means.

16. The valve device as claimed in claim 8 in which said actuator comprises a pilot valve and solenoid means.

References Cited
UNITED STATES PATENTS

| | | | |
|---|---|---|---|
| 2,834,368 | 5/1958 | Gray | 137—271 |
| 2,838,059 | 6/1958 | Biagi et al. | 137—269 X |
| 2,853,976 | 9/1958 | Gerwig et al. | 137—625 |
| 2,947,320 | 8/1960 | Oxley et al. | 137—271 |
| 3,202,170 | 8/1965 | Holbrook | 137—269 |

M. CARY NELSON, *Primary Examiner.*

MARTIN P. SCHWADRON, R. J. MILLER,
*Assistant Examiners.*